(12) United States Patent
Oakland

(10) Patent No.: US 6,296,028 B1
(45) Date of Patent: Oct. 2, 2001

(54) MOBILE OIL CHANGE DEVICE

(76) Inventor: Daryl R. Oakland, 1401 W. 143rd St., Apt. 126, Burnsville, MN (US) 55306

( * ) Notice: Subject to any disclaimer, the term of this patent is extended or adjusted under 35 U.S.C. 154(b) by 0 days.

(21) Appl. No.: 09/542,452

(22) Filed: Apr. 4, 2000

(51) Int. Cl.[7] .................................................. B65B 1/04
(52) U.S. Cl. ......................... 141/231; 141/65; 141/98; 184/1.5
(58) Field of Search ............................... 141/231, 98, 65; 184/1.5; 296/24.1, 26, 181

(56) References Cited

U.S. PATENT DOCUMENTS 4,724,875 * 2/1988 Baldwin et al. ..................... 141/98
4,981,318 * 1/1991 Doane et al. ..................... 296/24.1

* cited by examiner

*Primary Examiner*—Steven O. Douglas

(57) ABSTRACT

Disclosed is a mobile oil change device suitable for transporting to a remote site of an automobile movement of the automobile into an enclosure carried by the device and conducting an oil change in the automobile.

38 Claims, 4 Drawing Sheets

MOBILE OIL CHANGE DEVICE

FIELD OF THE INVENTION

The present invention relates to a mobile oil change device and more particularly to an oil change device that is mounted on wheels so that the device can be moved to a remote location to change oil in a motor vehicle.

BACKGROUND OF THE INVENTION

Oil changes in automobiles have been a bothersome chore since the automobile first came into existence. The term "automobile" as used herein refers to personal motor vehicles such as passenger cars, vans, pickup trucks and the like, e.g., the type of motor vehicle driven to the office or work. Initially, in the early days of the automobile, the owner merely pulled the plug from the oil pan, e.g., tank and let the oil drain out on the ground wherever the automobile was parked. This was a dirty job that necessitated the owner crawling under the automobile to remove the oil pan plug and an even more dirty job crawling back under the automobile to put the oil plug back in place after the oil was drained and present on the ground surface or in a pan. This method of oil change became unacceptable in many locations due to the pollution of the oil deposit left on the parking area. Today in many areas this would be in violation of local law.

As time went along, oil changes became almost exclusively carried out at the local automobile service station. This has been bothersome since it requires that the owner of the automobile arrange a time with the service station to bring the automobile into the service station. Often the owner of the automobile must leave the automobile for a half day or even a full day in the service station, necessitating obtaining other transportation. This other transportation may require ride sharing or the use of a second automobile of the owner.

The bothersome nature of the oil change has developed the need for a rapid oil change system. Businesses have developed around a promise of an oil change in an advertised quick change time, e.g. "15 minute Oil Change." This type of business has developed a technology that places a flexible tube down the dip stick tube in the automobile and the oil is sucked out using a vacuum. Fresh oil is then pumped into the automobile through the same dip stick tube. This type of business has often ended up with a line of automobiles waiting to get oil changes carried out.

A need remains for a non-bothersome way to get oil changes for the automobile, particularly of busy persons such as those working in office complexes. The present invention provides a solution for such need by providing a service vehicle that may be moved, e.g. driven or towed to the site where the automobile is located and the oil is changed on site. The present invention permits parking of the oil change service vehicle and the automobile receiving the service to be simultaneously parked in the same parking space. The present invention avoids the problem of the unsightly oil change by providing a service vehicle into which the automobile is driven into and enclosed while the oil change is carried out. The present service vehicle may be pulled into a parking ramp where the automobile is stored during the work day and the automobile may be driven into the service vehicle, the doors on the service vehicle closed and the oil change carried out without interfering with any other persons. In fact the present invention can be parked in the same parking space as the automobile has been parked. In other words in a busy parking ramp where all of the parking spaces are filed, the automobile may be removed from its parking space, the service vehicle moved into the parking space the automobile driven into the service vehicle and the oil changed.

SUMMARY OF THE INVENTION

The present invention provides a self contained service vehicle that includes everything that is necessary to carry out an oil change with the automobile enclosed and concealed within the service vehicle. The service vehicle has a chassis or frame that is supported on wheels. The frame may have a floor or support surface mounted thereon which may serve as a walk way for the service person conducting the oil change. The service vehicle may include a ramp that extends from the service vehicle support surface to the roadway o)r parking ramp floor. The ramp may be a pivotable door that can be lowered by pivoting of a hinge along the lower edge. Alternatively, the ramp may be a platform that is reciprocably mounted on a power system the automatically be extended or withdrawn by the mere push of a button. In other words the platform may be operated much like a drawer that slide along the lower part of the floor of the service vehicle. The service vehicle may include a second ramp that rises from the floor of the service vehicle to support the automobile in an elevated position within the service vehicle to permit the service person to crawl under the automobile to pull the oil drain plug. The service vehicle may include suitable tanks to receive and store the used oil and other tanks to store fresh oil to be placed in the automobile. The service vehicle may also include lighting such as flourescent lighting to facilitate the work of the service person. This lighting may be placed in the ceiling of the service vehicle. Additional lighting may be placed adjacent the floor of the service vehicle to light up the underside of the automobile which is having the oil changed. The service vehicle may include tanks or containers for new oil, extendable ceiling, computer analytical devices for testing the engine of the automobile, a computer printer for printing out information relating to the automobile such as test results and service records, generator equipment and other energy source equipment.

IN THE DRAWINGS

Figure 1:
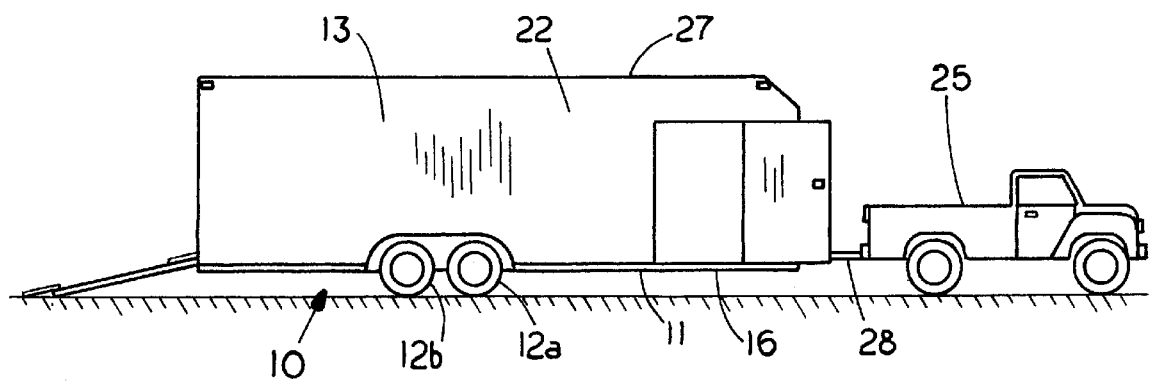
FIG. 1 shows a side view of the present invention.
Figure 2:
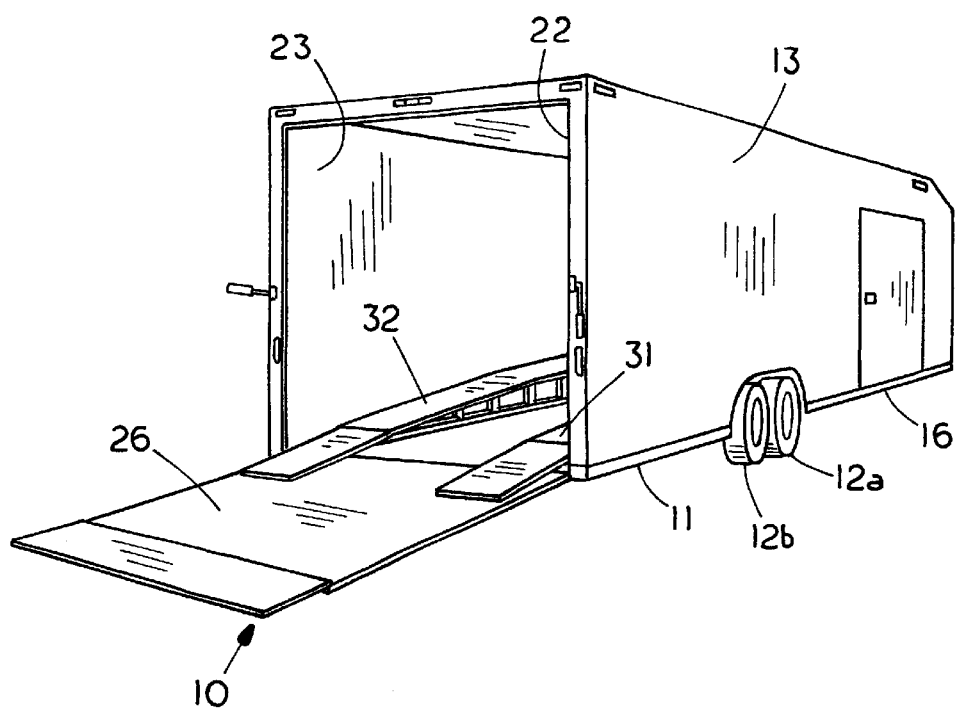
FIG. 2 shows a perspective side view of the present invention.
Figure 3:
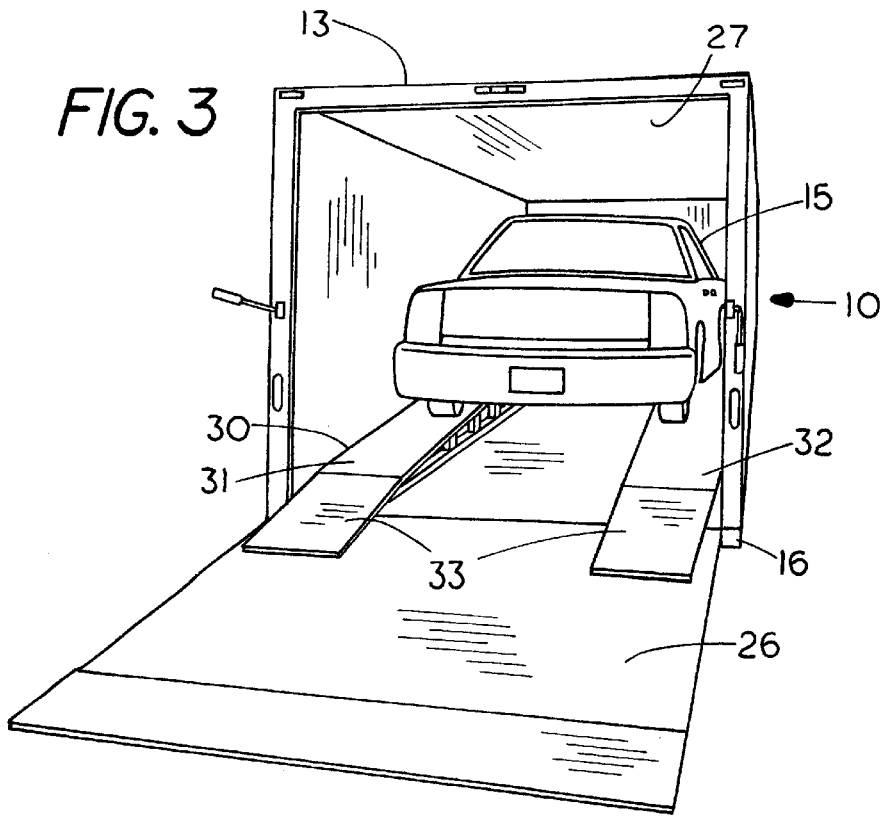
FIG. 3 shows a rear view of the present invention with an automobile in the enclosure.
Figure 4:
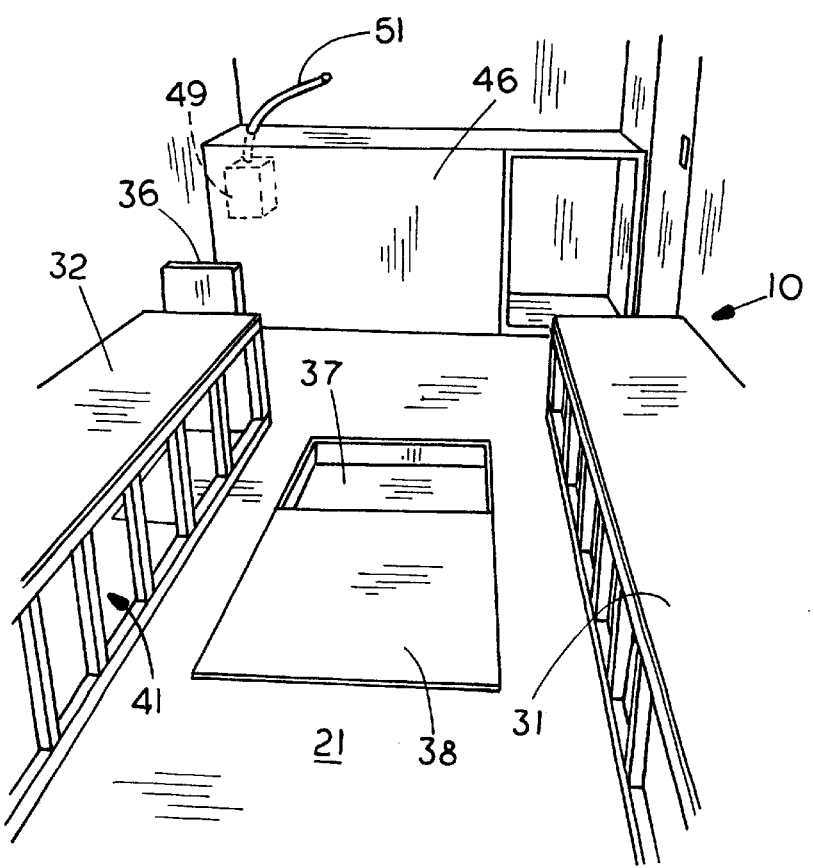
FIG. 4 shows an interior view of the present invention from the rear portion of the device.
Figure 5:
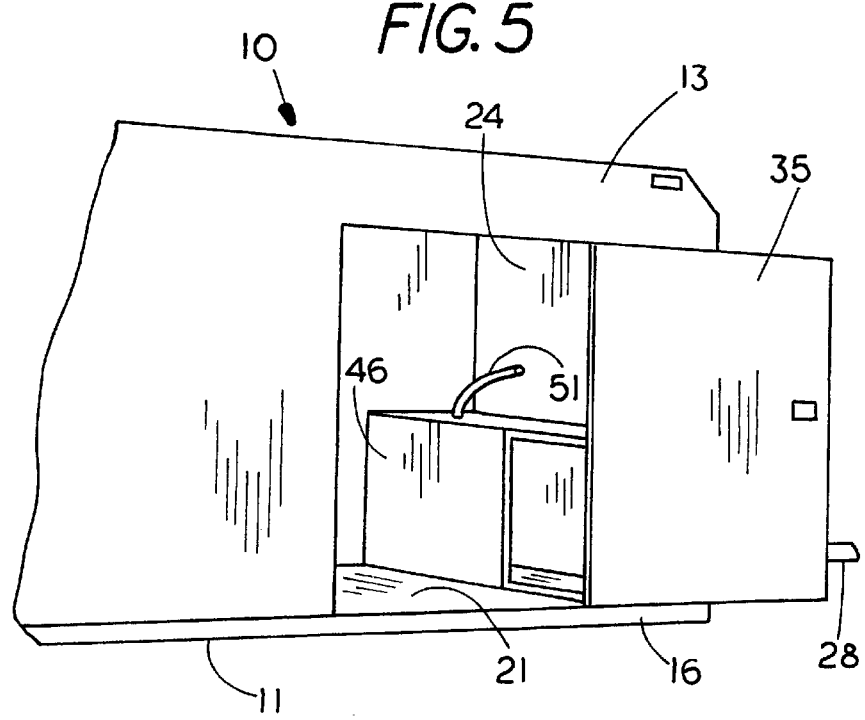
FIG. 5 shows a view through the open side door.
Figure 6:
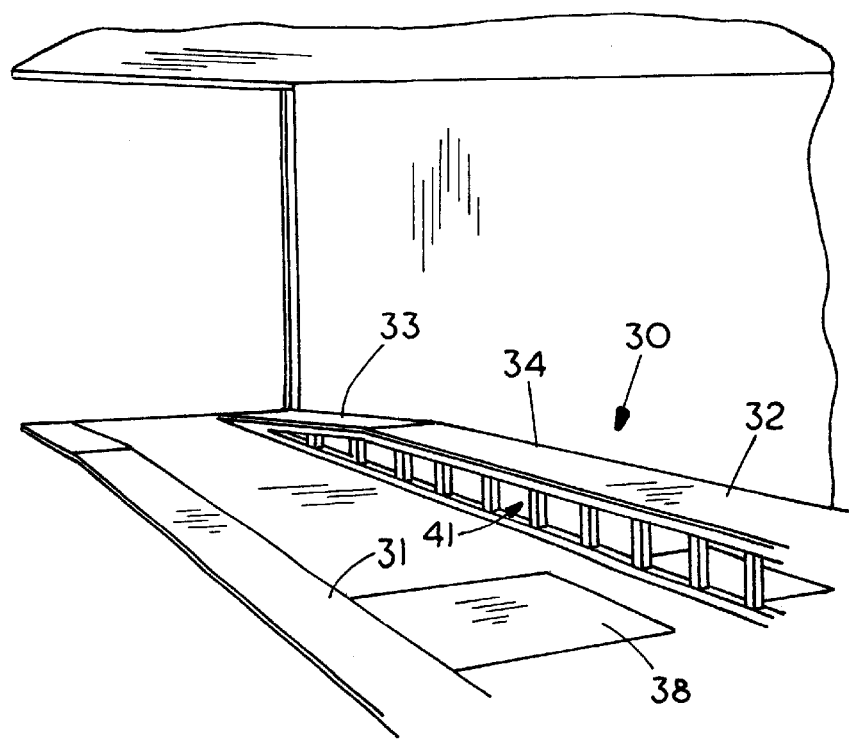
Figure 7:
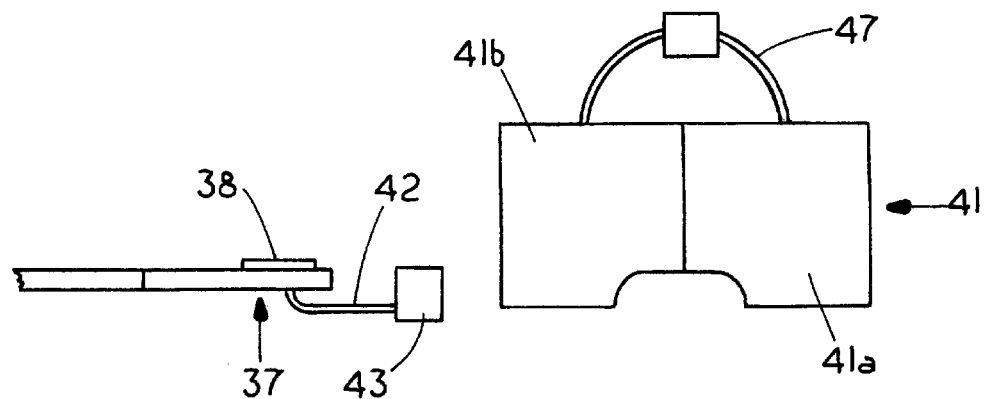
Figure 8:
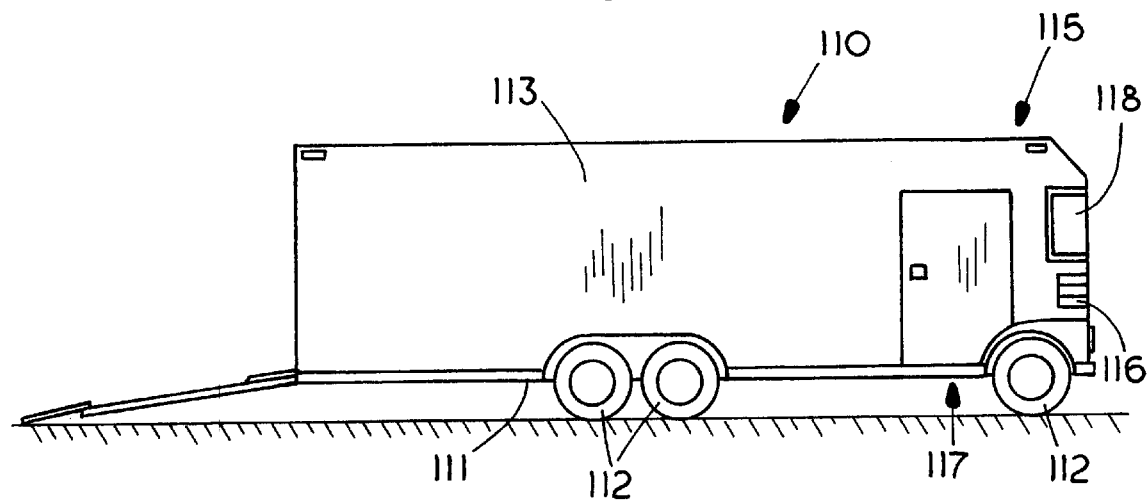

FIG. 6 an internal partial side view of the present invention showing the ramp and tanks;

FIG. 7 is a schematic view of the used oil storage tanks of the present invention; and FIG. 8 is a side view of an alternate embodiment of the present invention.

DETAILED DESCRIPTION OF THE PRESENT INVENTION

The oil changing device, e.g., service vehicle 10 of the present invention (FIGS. 1–7) may include a frame 11 supported on a plurality of wheels 12 and an enclosure 13 supported on the frame 11. The frame 11 may be constructed of steel or aluminum beams 16. The beams 16 may be channel beams or I-beams suitable to support the weight of an automobile 15. Typical beams may be channel beams of six to eight inches.

The frame 11 may be supported on any suitable set of wheels 12 that may for example be tandem wheels with corresponding axles. The wheels 12 desirably are of size and strength to support an automobile for carrying out the oil change. It is desirable to have wheels that are suitable for supporting an automobile in transit should it be desired to use the present invention to transport the automobile to a service garage for major repair. The wheels 12 may be spring supported to provide smooth travel even on roads that have chuck holes. The wheels 12 may include a pair of wheels 12a and 12b on one side of the device 10 and a corresponding pair of wheels (not shown) on the opposing side of the device 10. The wheels 12 may be of the type often used on automobiles or larger trailer wheels.

The enclosure 13 may include a platform 21 that substantially overlies the entire frame 11. The platform 21 may be constructed of sheet metal or a heavy weight plywood. The platform 21 is of sufficient strength to support the automobile 15 that is being serviced. If desired reinforcing may be provided. The enclosure 13 further includes side walls 22 and 23 and a forward wall 24. The side walls 22, 23 and the forward wall 24 may be of sufficient height to permit a service person to stand upright on the platform 21. The height of walls 22–24 will be about seven feet. The enclosure 13 includes a rear pivotable door 26 that may be hingedly connected to the frame adjacent along the lower edge of the door 26. The hinge and the door may be of sufficient strength to support the weight of an automobile 15 as the automobile 15 is being driven into the device 10. The enclosure 13 may include a top wall 27 that protects the interior during inclement weather. The walls 22–24 and 27 may be of the type used in the construction of camping trailers. The door 26 may be of a metal or strong polymer construction.

The device 10 includes mechanism 28 for moving the service vehicle to the site of the oil change, e.g. an arm structure or tongue, that may be attached to a towing vehicle such as pick-up truck 25. The tongue 28 may be of the type used to attach to a ball hitch. Alternatively, the device 10 may include its own power such as a compressed cab with its own engine.

The device 10 may have a track or ramp system 30 including two platforms 31 and 32. Each platform such as platform 32 has a sloped portion 33 that gradually rises upwardly to a planar portion 34 on which the automobile 15 may be supported as the oil is being changed. Desirably a block 36 is provided at the forward end of the planar portion 34 to prevent the automobile 15 from traveling off the ramp system 33. The ramp system 30 may be constructed of any suitable material such as steel of a gauge sufficient to support the automobile.

A collection tank 37 may be disposed in the platform 21. The tank 37 may be of shallow construction such as four to six inches in depth, twelve to fourteen inches in width and twenty four inches in length. The tank 37 has an upper surface that is coplanar with the platform 21. The tank 37 may have a door 38 serving as its upper surface. The door 38 may be powered to be withdrawn to permit oil to drain downwardly from the pan of the automobile into the tank 37. A second collection tank 41 may be provided under the platform 3 of the ramp system 30. The collection tank 37 may be connected to the tank 41 by piping 42. A pump 43 may be disposed in the piping 42 to pump oil from tank 37 to tank 41. The tank 41 may include two or more sections that are distinct storage reservoirs, such as reservoir 41a and 41b. One of such reservoirs may be located forwardly of the wheels and the other of such reservoirs may be located behind such wheels. A pump and piping 47 may be provided to control the relative amount of oil contained in each of such reservoirs to control the balance of weight within the device 10.

The device 10 may have a storage system 46 for containing fresh oil to be deposited in the automobile after the used oil has been removed. The fresh oil storage system may include a pump 49 and a hose 51 for feeding fresh oil to the automobile 15.

USE OF THE PRESENT INVENTION

The use of the present invention is apparent from the afore-description; never-the-less, the use of the present invention will be described to provide an even more complete understanding of the present invention. A person needing an automobile oil change may contact the service person operating the device 10 to schedule the oil change.

The service person may enter into the self contained motorized service vehicle and drive to the site where the oil change service is to be provided. Alternatively, the service person attaches the device 10 to an independent motor vehicle such as pick up truck 25. The pick up truck 25 and service vehicle device 10 is driven to the site of the automobile 15. The door 26 is lowered into contact with the road surface. The automobile 15 is driven up the platform provided by the door 26 and onto the ramp system 30. The door 26 is closed. The service person then opens the door 35 and enters the chamber 35 in front of the automobile 15. Since the automobile 15 is elevated on the ramp system 30 above the floor 21, the service person can readily move beneath the automobile 15 for servicing the automobile 15. The lid 38 of the tank 37 is opened and the oil plug of the automobile 15 is removed permitting the oil to drain into the tank 37. Once the oil has been fully drained the oil filter is changed. The oil plug is then replaced in the automobile 15 and the lid 38 of tank 37 is closed. The hood of the automobile 15 is raised providing access to the oil inlet of the automobile engine. The oil inlet cap is removed and the hose 51 is extended to the oil inlet and the proper amount of oil is metered to the engine. The hose 51 is then restored to its proper location and the oil inlet cap is replaced closing the oil inlet. The door 26 is lowered and the automobile 15 is driven out of the device 10. The door 26 is raised to its closed position and the device 10 is then driven to the next location where oil is to

ALTERNATIVE EMBODIMENT

A second embodiment of the present invention 110 is illustrated in FIG. 8 and includes a frame 111 supported on a plurality of wheels 112 and an enclosure 13 supported on the frame 111. The device 110 includes a cab portion 115 including a drive mechanism 116, such as an engine and a compartment 117 into which the service person may enter to drive the device 110 to the site where the oil change will take place. The construction and internal components may be similar to those described with respect to the device 10. The device 110 may include a windshield 118.

While preferred embodiments of the present invention have been disclosed various modifications may be made if desired. For example, one modification would be to provide an upper portion of the enclosure member 23 as a telescoping member. In other words the top 27 and the upper portion of side walls 22 and 23 telescope over the lower portion of the side walls 22 and 23. This permits passing through low portions in the entryway of a parking ramp and yet permits raising the telescoping member 23 to receive a vehicle that has a greater height than a typical passenger car, e.g. a van or pick up truck. Also the frame 11 may be supported on a pneumatic mechanism to raise and lower the frame with respect to the wheels. Thus once the device is located in the parking ramp, the frame 11 may be lowered permitting the telescoping member to be expanded to an even greater height with respect to the floor of the device 10 without encounter interference with the ceiling in the ramp.

What is claimed is:

1. A method for changing oil in an automobile engine comprising removing an automobile from a parking stall, moving a service vehicle having an oil change compartment into said parking stall; moving the automobile into the oil change compartment, removing said automobile from said compartment, removing said service vehicle from said stall and replacing the automobile into said stall.

2. The method of claim 1 wherein said service vehicle includes
   a frame supported on a plurality of wheels:
      track means supported on said frame, said track means being adapted for raising an automobile from a road surface onto said frame and for supporting said automobile while the oil is changed in said automobile;
      tank means for receiving said oil from said automobile; and
      enclosure means that is adapted to completely enclose an automobile as oil is being changed in said automobile; and
      means for moving the service vehicle to the site of the oil change.

3. The method of claim 2 wherein said service vehicle includes a powered cab contained within said enclosure means and said method includes the step of transporting the service vehicle to the site of the oil change using the powered cab.

4. A service vehicle device for changing the oil in an automobile; said device comprising:
   a frame supported on a plurality of wheels:
      track means supported on said frame, said track means being adapted for raising an automobile from a road surface onto said frame and for supporting said automobile while the oil is changed in said automobile;
      tank means for receiving said oil from said automobile; and
      enclosure means that is adapted to completely enclose an automobile as oil is being changed in said automobile; and
      means for moving the service vehicle to the site of the oil change.

5. The service vehicle of claim 4 wherein said device includes a powered cab for moving the device to the site of the oil change.

6. The service vehicle device of claim 4 wherein said track means includes moveable track for extending from said frame to the surface on which said device resides.

7. The service vehicle device of claim 6 wherein said frame includes a primary platform that serves to support a person that is carrying out the oil change.

8. The service vehicle of claim 6 wherein said tank means are disposed adjacent one side of primary platform.

9. The service vehicle of claim 6 wherein said tank means comprise a tank including at least a first tank portion, a second tank portion and means for transferring oil from said first tank portion to the other of said tank portion.

10. The service vehicle device of claim 9 wherein said second tank portion has two sections, one of said sections being disposed forward of said wheels and the second of said sections being disposed to the rear of said wheels.

11. The service vehicle device of claim 10 wherein said tank sections communicate with each other through pump means and wherein said pump means serve to move oil from one of said sections to the other of said sections to maintain a desired balance of weight forward of said wheels.

12. The service vehicle device of claim 11 wherein said device includes fresh oil storage means and means for removing fresh oil from said fresh oil storage means to the oil reservoir of an automobile.

13. The service vehicle of claim 6 wherein said first tank portion is a shallow tank portion disposed in the center of primary platform in a position to receive oil as the oil is drained from the pan in the automobile and wherein said second lank portion is disposed on the platform at a position along one side of said service vehicle.

14. The service vehicle of claim 6 wherein said vehicle comprises a trailer and wherein said tracks are elevated above said primary platform to permit the movement of a person beneath the automobile to facilitate the changing of the oil.

15. The trailer of claim 14 wherein said device is supported on a first rotatable wheel disposed adjacent one side of the trailer device and a second rotatable wheel disposed adjacent the second side of said trailer.

16. The trailer of claim 15 wherein said first and second wheels are disposed slightly to the rear of the center of gravity of the frame of the trailer such that the balance of the trailer is weighted toward the forward end of the service vehicle.

17. The service vehicle device of claim 15 wherein said device includes enclosure means that is adapted to completely enclose an automobile as oil is being changed in said automobile.

18. The service vehicle device of claim 14 wherein said device includes a powered cab for moving the device to the site of the oil change.

19. A service vehicle device for changing the oil in an automobile; said device comprising:
   a frame supported on a plurality of wheels:
      track means supported on said frame, said track means being adapted for raising an automobile onto said frame and for supporting said automobile while the oil is changed in said automobile;
      means for entirely enclosing said automobile while said oil is being changed
      tank means for receiving said oil from said automobile.

20. The service vehicle device of claim 19 wherein said track means includes moveable track for extending from said frame to the surface on which said device.

21. The service vehicle device of claim 20 wherein said device is supported on a first rotatable wheel disposed adjacent one side of the service vehicle device and a second rotatable wheel disposed adjacent the second side of said service vehicle.

22. The service vehicle device of claim 19 wherein said frame includes a primary platform that serves to support a person that is carrying out the oil change.

23. The service vehicle device of claim 22 wherein said first and second wheels are disposed slightly to the rear of the center of gravity of the frame of the service vehicle wherein the balance of the service vehicle is weighted toward the forward end of the service vehicle.

24. The service vehicle device of claim 22 wherein said second tank portion has two sections, one of said section being disposed forward of said wheels and the second of said section being disposed the rear of said wheels.

25. The service vehicle device of claim 24 wherein said tank section communicate with each other through means and wherein said pump means serve to move oil from one of said sections to the other of said sections to maintain a desired balance of weight forward of said wheels.

26. The service vehicle device of claim 25 wherein said device includes fresh oil storage means and means for moving fresh oil from said fresh oil storage means to the oil reservoir of an automobile.

27. The service vehicle of claim 19 wherein said tank means are supported beneath said primary platform.

28. The tailor of claim 19 wherein said tank means comprise a tank including at least a first tank portion, a second tank portion and means for transferring oil from said first tank portion to the other said tank portion.

29. The service vehicle of claim 28 wherein said first tank portion is a shallow tank portion disposed in the center of primary platform in a position to receive oil as the oil is drained from the pan in the automobile and wherein said second tank portion is disposed on the platform at a position along one side of said service vehicle.

30. The service vehicle of claim 19 wherein said track means are elevated above said primary platform to permit the movement of a person beneath the automobile to facilitate the changing of the oil.

31. The service vehicle device of claim 25 wherein said device includes enclosure means that is adapted to completely enclose an automobile as oil is being changed in said automobile.

32. The service vehicle device of claim 4 wherein said device includes telescoping wall means to permit raising and lower the overall height of said device.

33. The service vehicle device of claim 32 wherein said device includes means to permit raising and lower said frame.

34. The service vehicle device of claim 32 wherein said device includes means to permit raising and lower said frame.

35. A service vehicle device for changing the oil in an automobile; said device comprising:
  a frame supported on a plurality of wheels:
    track means supported on said frame, said track means being adapted for raising an automobile from a road surface onto said frame and for supporting said automobile while the oil is changed in said automobile;
    tank means for receiving said oil from said automobile, said tank means being disposed adjacent one side of primary platform, said tank means having at least two sections, one of said sections being disposed forward of said wheels and the second of said sections being disposed to the rear of said wheels;
    enclosure means that is adapted to completely enclose an automobile as oil is being changed in said automobile; and
    means for moving the service vehicle to the site of the oil change.

36. A service vehicle device for changing the oil in an automobile; said device comprising:
  a frame supported on a plurality of wheels, said frame including a primary platform adapted to support a person that is carrying out the oil change;
  track means supported on said frame, said track means being adapted for raising an automobile onto said frame and for supporting said automobile while the oil is changed in said automobile;
  tank means for receiving said oil from said automobile, said tank means comprising a tank including at least a first tank portion, a second tank portion and means for transferring oil from said first tank portion to the other said tank portion, one of said tank portions being disposed forward of said wheels and the other of said tank portions being disposed the rear of said wheels, wherein said tank portions communicate with each other through said transferring means and wherein said transferring means serve to move oil from one of said tank portions to the other of said tank portions to maintain a desired balance of weight forward of said wheels.

37. A service vehicle device for changing the oil in an automobile; said device comprising:
  a frame supported on a plurality of wheels;
  track means supported on said frame, said track means being adapted for raising an automobile from a road surface onto said frame and for supporting said automobile while the oil is changed in said automobile;
  tank means for receiving said oil from said automobile;
  enclosure means adapted to completely enclose an automobile as oil is being changed in said automobile;
  said device including telescoping wall means to permit raising and lower of the overall height of said device and
  means for moving the service vehicle to the site of the oil change.

38. A service vehicle device for changing the oil in an automobile; said device comprising:
  a frame supported on a plurality of wheels, said device including means to permit raising and lower of said frame;
  track means supported on said frame, said track means being adapted for raising an automobile from a road surface onto said frame and for supporting said automobile while the oil is changed in said automobile;
  tank means for receiving said oil from said automobile;
  enclosure means adapted to completely enclose an automobile as oil is being changed in said automobile; and
  means for moving the service vehicle to the site of the oil change.

* * * * *